United States Patent [19]

Mok

[11] Patent Number: 5,208,708
[45] Date of Patent: May 4, 1993

[54] COPY GUARD SYSTEM OF A SOFTWARE PROGRAM USED IN VTR

[75] Inventor: Do-Sang Mok, Selul, Rep. of Korea

[73] Assignee: Samsung Electronics Co., Ltd., Suweon, Rep. of Korea

[21] Appl. No.: 779,196

[22] Filed: Oct. 22, 1991

[30] Foreign Application Priority Data

Apr. 19, 1990 [KR] Rep. of Korea .................. 91-6341

[51] Int. Cl.⁵ .............................................. G11B 15/04
[52] U.S. Cl. ...................................... 360/60; 358/349; 358/335; 360/37.1
[58] Field of Search ................. 360/60, 37.1; 358/319, 358/120, 148

[56] References Cited

U.S. PATENT DOCUMENTS 4,631,603 12/1986 Ryan ...................................... 360/60
4,937,679 6/1990 Ryan ...................................... 360/60

*Primary Examiner*—Vincent P. Canney
*Attorney, Agent, or Firm*—Cushman, Darby & Cushman

[57] ABSTRACT

A copy guard system is provided for protecting software in a video tape recording (VTR) system. The copy guard system includes a positive edge detection circuit for detecting a positive edge of an input VTR head switch pulse signal, a negative edge detection circuit for detecting a negative edge of the input VTR head switch pulse signal, a counter for generating a fixed duration pulse signal in response to the positive edge, a clamp circuit for clamping an input image signal, a gate pulse generating circuit for generating a pulse signal before the end of the fixed duration pulse signal, and a level detector for determining whether a copy guard signal is set in response to an output from the clamp circuit and the pulse signal. A pulse detection generating circuit is coupled to the level detector for transmitting a rectangular waveform to a signal killer pulse generating circuit. The signal killer pulse generating circuit receives the rectangular waveform and the signal from the positive edge detection circuit and generates a killer pulse in order to control a signal only during the period of having an image signal in one field. A signal killer circuit receives the clamped output and the killer pulse to control the output of the image signal.

1 Claim, 6 Drawing Sheets

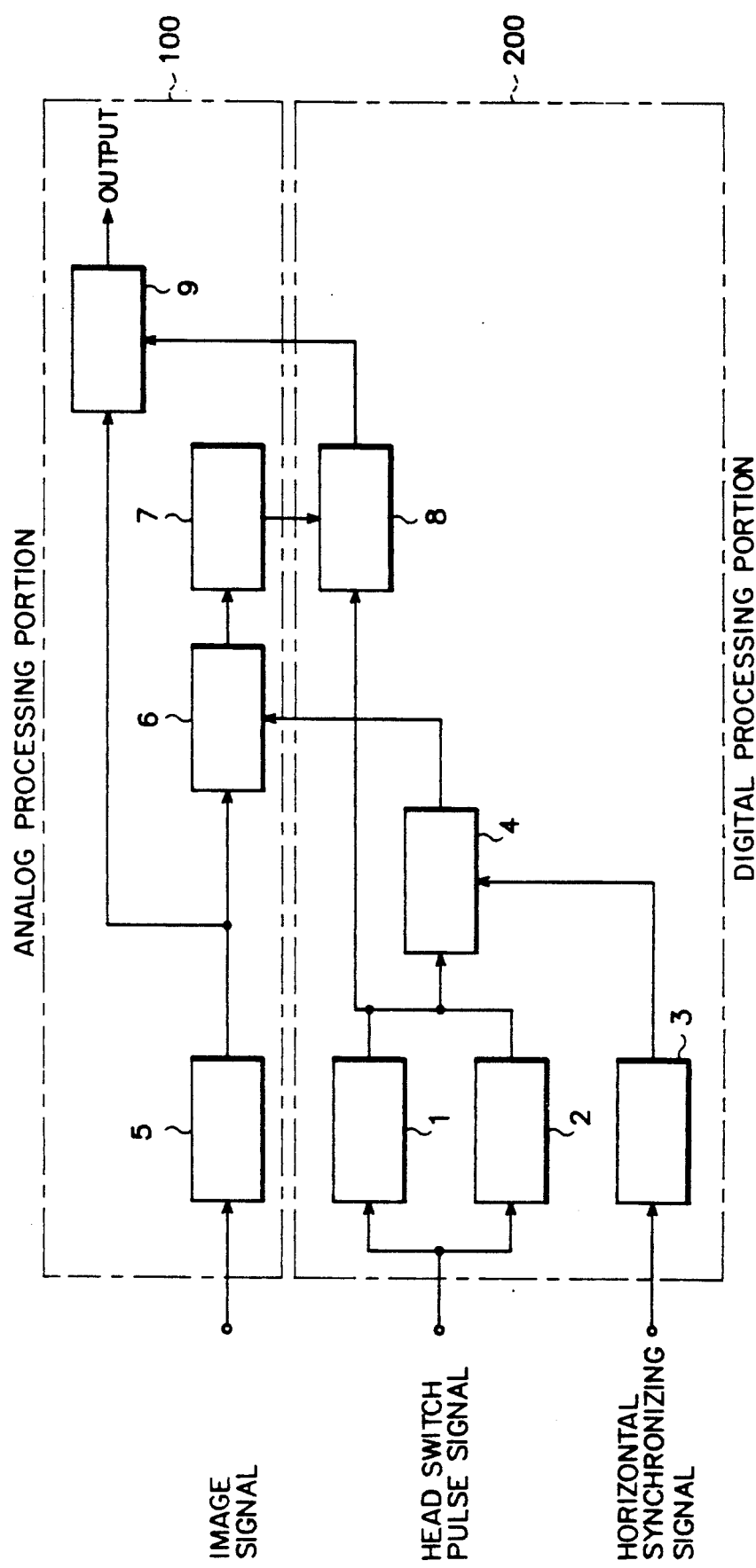

COPY GUARD SYSTEM OF A SOFTWARE PROGRAM USED IN VTR

BACKGROUND OF THE INVENTION

1. Field of the Invention

The present invention relates to a copy guard system for protecting software in a video tape recorder by providing a circuit which determines the existence and/or non-existence of a copy guard signal when a video tape recorder is set.

2. Description of the Related Background Art

Generally, in a recording system having video signals such as in a video tape recorder (hereinafter referred to as VTR), when an input composite video signal passes a low pass filter, a luminance signal is taken out from the composite video signal and a chrominance signal then removed.

When the composite video signal is passed through a low pass filter and the amplitude of the input video signal modulated, the video signal is maintained at a constant amplitude using an auto gain control (hereinafter referred to as AGC) circuit.

Conventionally, in a video home system (VHS) type of VTR, the AGC circuit provides peak AGC and keyed AGC.

If an input image signal exceeds a predetermined amplitude input, a peak AGC circuit controls the amplitude by a predetermined value.

If an input image signal falls below a predetermined amplitude, a keyed AGC circuit controls the amplitude by a predetermined value.

Therefore, the horizontal synchronizing signal is of fixed value regardless of a change in the luminance signal being output from the AGC circuit.

Commonly, in an AGC circuit having only peak AGC, a screen is dark and the luminance signal is lowered.

Accordingly, there is a disadvantage in that a synchronizing signal is larger than a predetermined value so as to constantly maintain an entire size of a screen.

The peak AGC circuit operates such that a peak of a synchronizing signal corresponding to a television wave is input at a constant value independent of the brightness of a screen. As a result, AGC voltage is obtained from this peak. Because the output of an AGC circuit is large, if a large noise pulse is input, the voltage of this noise pulse is charged into a capacitor and the discharge time is lengthened by a resistor.

Accordingly, a peak AGC circuit has the disadvantage that a large output from the circuit continues for a minute while the synchronization is unstable.

The keyed AGC circuit was designed to solve the above disadvantage.

The keyed AGC circuit is one of the AGC circuits in a TV set.

If a noise of amplitude greater than the synchronization signal amplitude is input, the AGC circuit selects and operates only during the input of the horizontal synchronizing signal so as to easily operate the AGC circuit.

Also, because the keyed AGC circuit does not have the confusion associated with pulse noise and is stable regardless of screen brightness, the keyed AGC has been widely employed.

However, in a keyed AGC circuit, a long time constant exists when detecting an analog signal in an effort to provide the VTR with a copy prevention function.

Accordingly, when a copy guard signal is activated, the detected signal level and the discharging time continue for a long time.

The AGC detection portion provides signal gain characteristic in relation to the detected signal level.

When the detected signal level is large, as would be the case when a copy guard signal is set, a recording loop signal becomes smaller so as not to be copied by lessening the size of the signal output from the AGC circuit.

Accordingly, the keyed AGC circuit has the disadvantage that AGC characteristics are comprised by a change in time constant.

SUMMARY OF THE INVENTION

Therefore, the present invention was made so as to solve the above mentioned problems.

An object of the present invention is to provide a copy guard system for preventing an illegal copy of software in a video tape recorder. The above system is provided at a recording loop of a video tape recorder and after an integrating circuit.

To achieve the above object, the present invention comprises:

positive edge detection means for detecting a positive edge of an input VTR head switch pulse signal;

negative edge detection means for detecting a negative edge of the input VTR head switch pulse signal;

counter means for generating a pulse signal of fixed duration in response to said positive edge;

clamp means for clamping an input image signal;

gate pulse generating means for generating a pulse signal before the end of said pulse signal of fixed duration;

level detection means for determining whether a copy guard signal is set in response to an output from said clamp means and the pulse signal generated by said gate pulse generating means;

pulse detection generating means coupled to said level detection means for transmitting a rectangular waveform to a signal killer pulse generating means;

said signal killer pulse generating means generating a killer pulse in order to control a signal only during the period of having an image signal in one field, said signal killer pulse generating means receives the signal output from said pulse detection generating means and the signal output from said positive edge detection means; and signal killer means, receiving the signal output from said clamp means and at the same time receiving the signal output from said signal pulse generating means, for controlling the output of the image signal.

BRIEF DESCRIPTION OF THE DRAWINGS

The above object and feature of the present invention will be apparent from the following description of the preferred embodiments with reference to the attached drawings.

FIG. 2 is a circuit diagram showing a copy guard system.

DESCRIPTION OF THE PREFERRED EMBODIMENTS

A preferred embodiment of the present invention will be described hereinafter in detail with reference to the accompanying drawings.

Figure 1A:
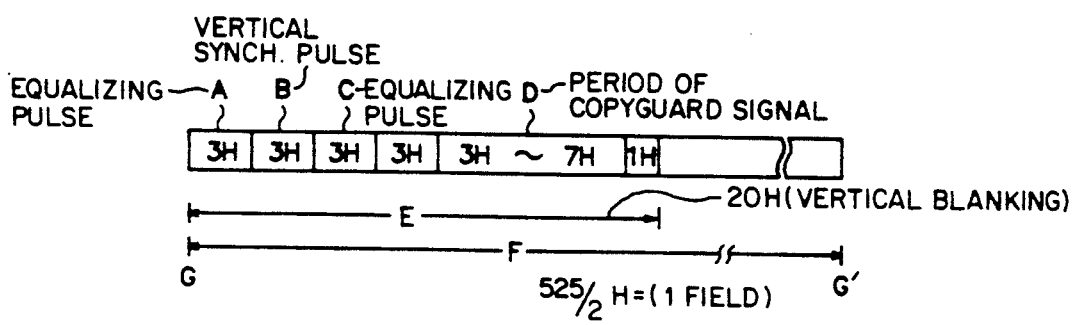
FIG. 1A is a view showing the position of a copy guard signal within a field.
Figure 1B:
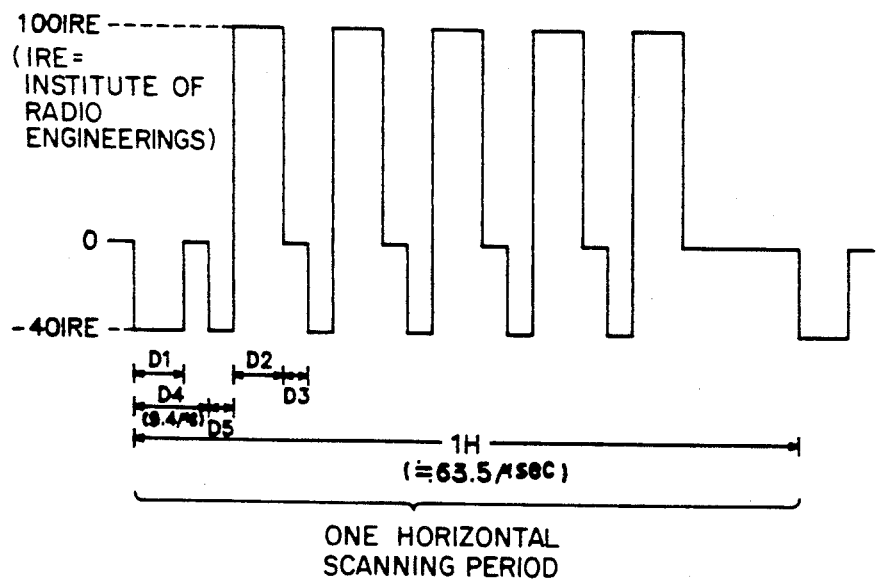
FIG. 1B is a view showing a copy guard signal.

FIG. 1A shows a position of a copy guard signal D within one field G—G' of a video signal, and FIG. 1B shows a copy guard signal which is commonly employed.

In FIGS. 1A and 1B, a horizontal synchronizing pulse signal is shown added to a period of a vertical synchronizing pulse signal B. This is done because the horizontal synchronizing pulse signal does not scatter during the period of a vertical synchronizing pulse signal. Also, equalizing pulse signals A and C are respectively added before and after a vertical pulse synchronizing signal B.

The width of equalizing pulse signals A and C is 0.04H (half of a horizontal synchronizing signal), and the period is 0.5H (half of a vertical synchronizing signal). The period (0.5H) multiplied by six is equal to 3H which is the same as the period of an equalizing pulse.

The equalizing pulse signal is effective for interlaced scanning. It serves as a horizontal synchronizing signal during a long vertical retrace line interval and also stabilizes horizontal synchronization. Also, the copy guard signal contains 3 to 7 signals as shown in FIG. 1B during 3H to 7H, respectively, measuring from 13H of a field start.

Signal waveforms are a function of the copy guard signal so as to prevent copying when the copy guard signal is set.

D1 indicates the width of a horizontal synchronizing pulse signal, D2 indicates the width of a peak level, D3 indicates the width of a pseudo-synchronizing front porch, and D5 indicates the width of a pseudo-synchronizing pulse signal.

FIG. 2 shows a copy guard system according to the present invention.

A head switch pulse signal is input to positive edge detection circuit 1 and negative edge detection circuit 2 for detecting each of a positive edge and a negative edge thereto.

A horizontal synchronizing pulse signal is input into counter circuit 3 and counted up to 20H; measuring from the positive edge of the head switch pulse signal.

In response to output signals from edge detection circuits 1 and 2 and counter circuit 3, a gate pulse signal is generated by gate pulse generating circuit 4.

Level detection circuit 6 receives a clamped image signal from clamp circuit 5 and the gate pulse signal from gate pulse generating circuit 4, to provide a detection function corresponding to the existence or nonexistence of a copy guard signal.

Pulse detection generating circuit 7 receives the signal from level detection circuit 6 and generates a pulse detected output signal having a rectangular waveform in response thereto. The rectangular waveform is then sent to signal killer pulse generating circuit 8.

Signal killer pulse generating circuit 8 receives the transmitted signal from pulse detection generating circuit 7 together with the edge detection output signals from edge detection circuits 1 and 2 to produce a pulse "h" shown in FIG. 6 which defines the period in each field having a video signal.

Signal killer circuit 9 receives the clamped image signal transmitted from clamp circuit 5 and the pulse "h" (killer signal) output from signal killer pulse generating circuit 8 the signal, to control the output characteristics of the image signal.

Figure 3A:
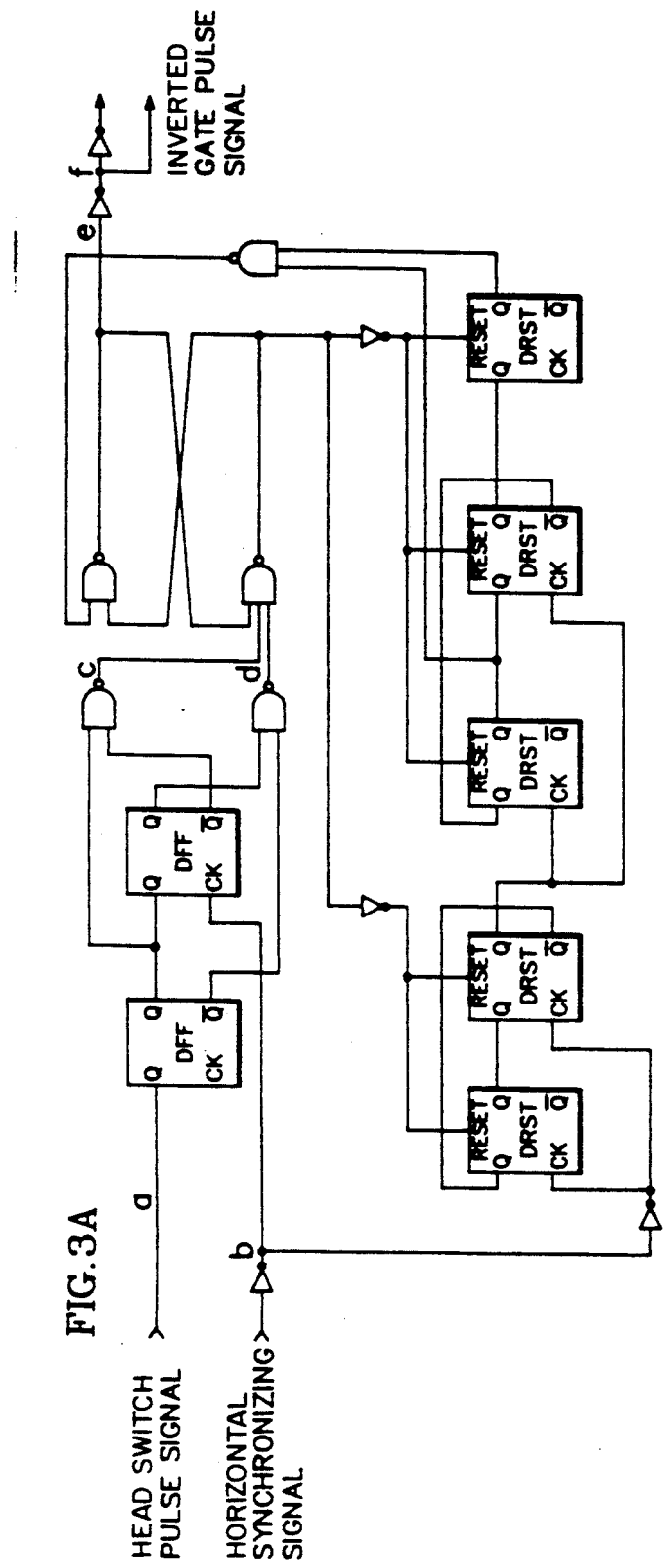
FIGS. 3A and 3B are a detailed circuit and waveform diagram, respectively, of a portion of the system in FIG. 2.

FIG. 3A is a detailed circuit diagram corresponding to edge detection circuits 1 and 2, counter circuit 3 and gate pulse generating circuit 4 of FIG. 2.

Figure 3B:
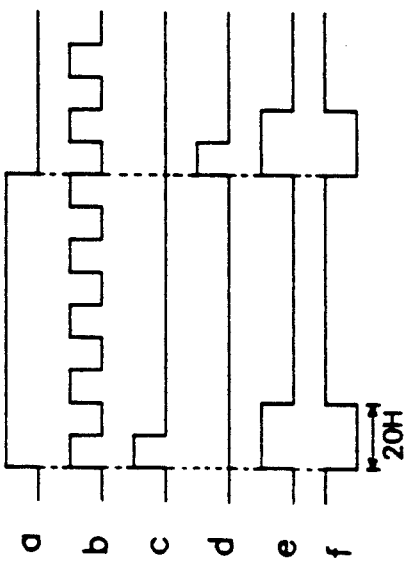

FIG. 3B is a waveform diagram thereof.

In FIGS. 3A and 3B, the gate pulse signal is shown as waveform "f". The gate pulse signal is inverted and input into level detection circuit 6 and is operational only during a 20H (vertical blanking) period corresponding to the period in which a copy guard signal may be set.

Figure 4A:
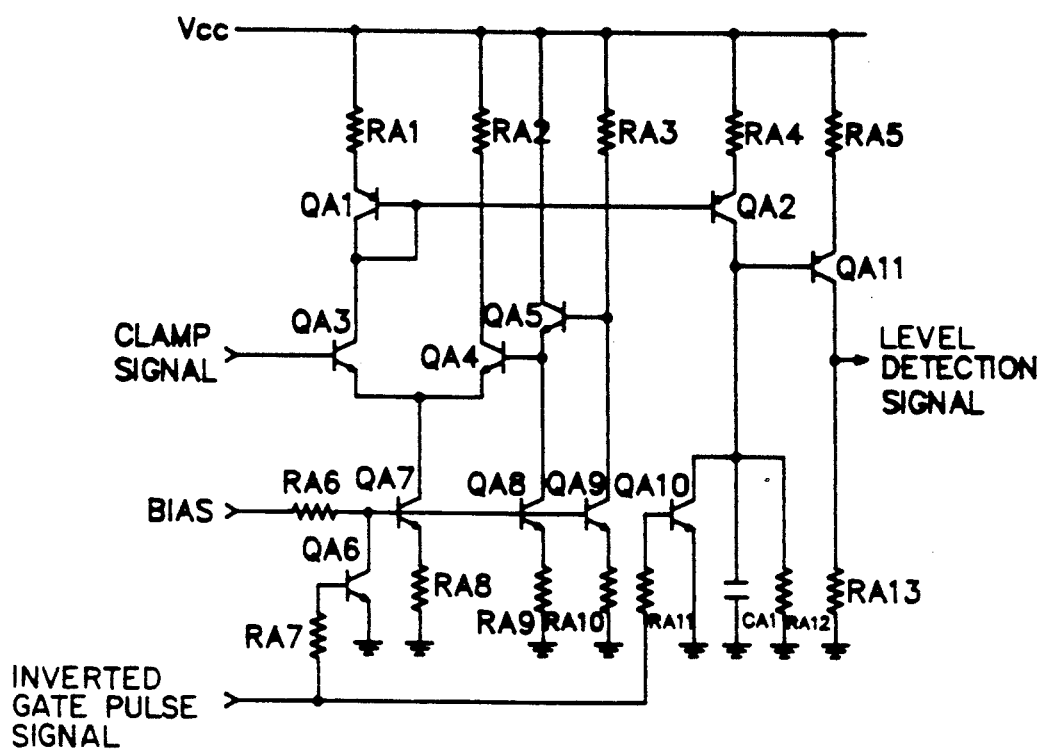
FIG. 4A is a circuit diagram of the level detection circuit shown in FIG. 2.

FIG. 4A shows a detailed circuit of level detection circuit 6. When the gate pulse signal "f", as shown in FIG. 3B, is input into level detection circuit 6, the circuit is operational during the 20H period counting from the rising edge of pulse "a" shown in FIG. 3B.

In the above operation, when a copy guard signal is set, the copy guard signal is input into the base of transistor QA3. If the copy guard signal is larger than the voltage at the base of transistor QA4, transistor QA3 is turned-on, transistor QA1 is turned on and transistor QA2 is turned-on.

Figure 4B:
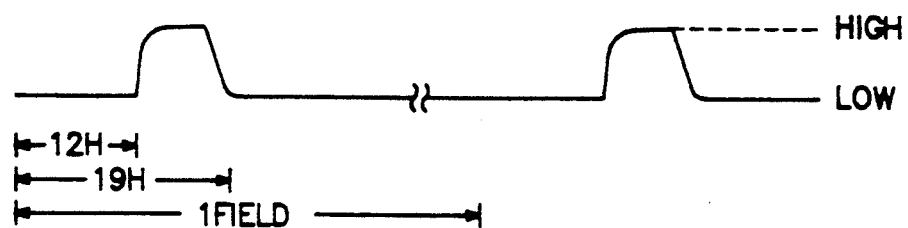
FIG. 4B is an input waveform diagram showing a relation between "Vref" and an output waveform from the level detection circuit of FIG. 4A.

As a result, the current through transistor QA2 charges capacitor CA1. The current waveform of the charged capacitor CA1 forms an integral waveform as shown in FIG. 4B.

Transistor QA6 and transistor QA10 are in the "off state" during the time the copy guard signal is set, i.e., during the "20H" period of the inverted gate pulse signal. Similarly, these transistors are "on" (saturated) the rest of the time.

Figure 5A:
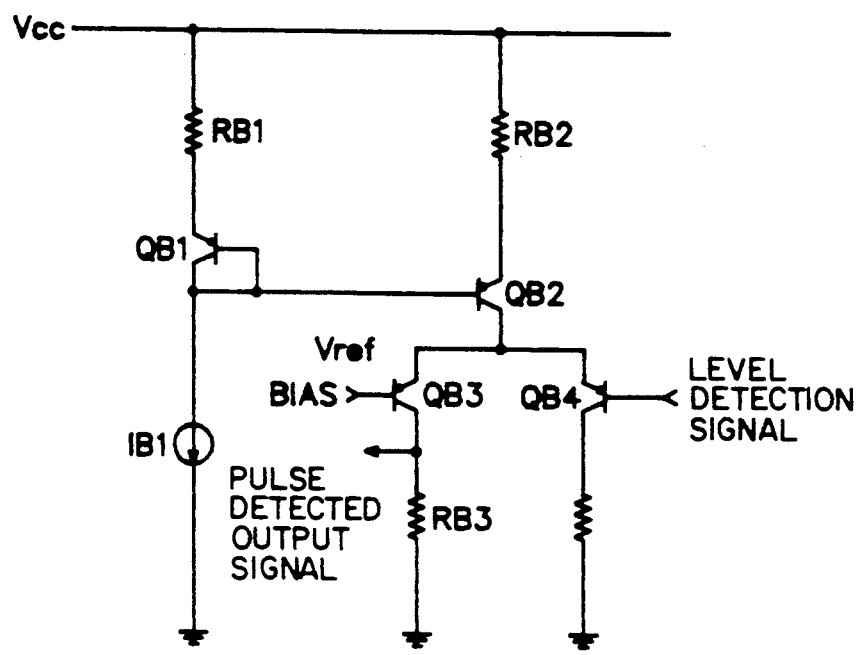
FIG. 5A is a circuit diagram of the pulse detection generating circuit shown in FIG. 2.

FIG. 5A shows a detailed circuit of the pulse detection generating circuit 7. As shown in FIG. 5A, a voltage source is connected to the emitter of transistor QB1 and transistor QB2 through resistors RB1 and RB2, respectively. The collector of transistor QB1 is connected to ground via a constant current source.

The base of transistor QB2 is coupled to the base and collector of transistor QB1 and the collector of transistor QB2 is connected to a comparator circuit consisting of transistors QB3 and QB4.

A reference voltage (Vref) is biased at the base of transistor QB3. The collector of transistor QB3 is connected to ground through resistor RB3 while the collector of transistor QB4 is connected to ground.

In operation as shown in FIG. 5, the comparator circuit, comprising transistors QB3 and QB4, compares the level detection signal input thereto with the biased reference voltage.

As a result, when the value of the reference voltage is lower than the value of the level detection signal, transistor QB3 is turned-on and the collector current of transistor QB2 is permitted to drive resistor RB3.

Thus, a drive voltage defined by the value of ICB2×RB3 is added. When the value of the level detection signal is not higher than the value of the reference voltage, current will not flow through resistor RB3 and the output will be the low-state.

Figure 5B:
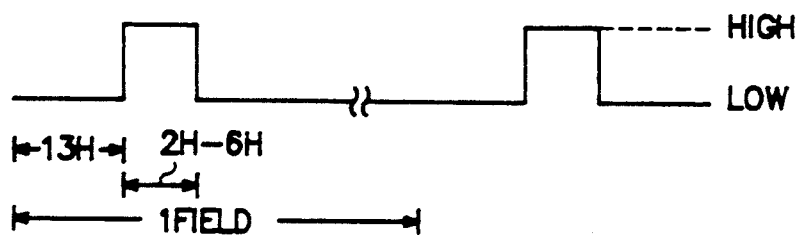
FIG. 5B is a diagram showing the output waveform of the pulse detection generating circuit in FIG. 5A.

Thus, when the copy guard signal is set and input to the base of transistor QA3, the output waveform of the pulse detected output signal generated by the pulse detection generating circuit in FIG. 5A is a complete rectangular wave as shown in FIG. 5B.

Figure 6A:
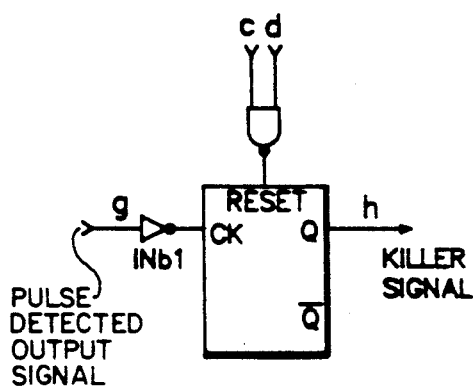
FIGS. 6A and 6B are a circuit and waveform diagram, respectively, of the signal killer pulse generating circuit in FIG. 2.
Figure 6B:
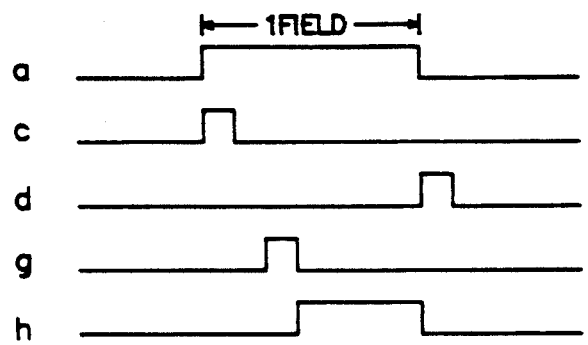

FIGS. 6A and 6B are a detailed circuit and waveform diagram of signal killer pulse generating circuit 8 shown in FIG. 2. The pulse detected output signal received from pulse detection generating circuit 8 is fed to inverter INb1 and then input to an RS-flip-flop clock terminal. Also, signals "c" and "d" from the circuit in FIG. 3a are input to the reset terminal of the RS-flip-flop through a nand-gate.

In response, a killer signal is output through terminal "Q" at the falling edge of the signal "g" corresponding to the pulse detected output signal shown in FIGS. 6A and 6B.

Figure 7:
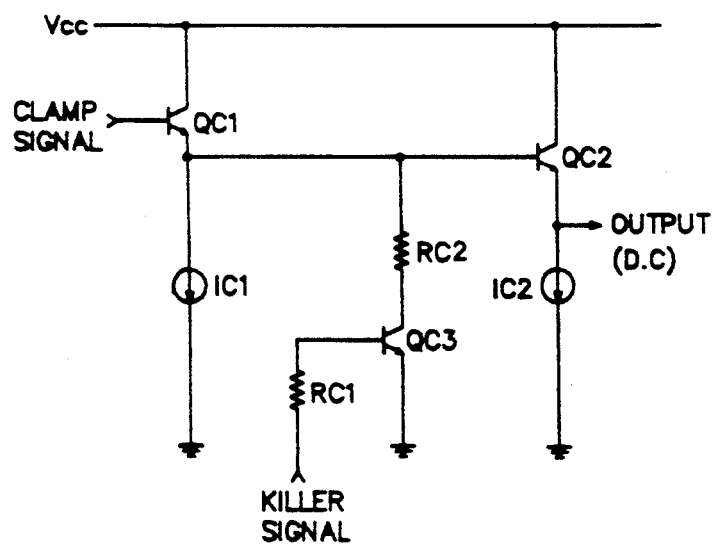
FIG. 7 is a circuit diagram of a signal killer circuit in FIG. 2.

FIG. 7 shows a circuit diagram of the signal killer circuit in FIG. 2.

Transistor QC1 and transistor QC2 are connected to a voltage source line. The base terminal of transistor QC1 is connected to "ground" through DC current source IC1 and at the same time is connected to the base of transistor QC2. Also, the clamped image signal coupled to level detection circuit 6 is also connected to the base of transistor QC1. The collector of transistor QC3 is connected to the emitter of transistor QC1 and the base of transistor QC2 through resistor RC2, and the base of transistor QC3 receives the killer signal from signal killer pulse generating circuit 8 through resistor RC1. The collector of transistor QC3 is connected to ground. As a result, the clamped image signal input thereto is output as a function of the killer signal input via resistor RC1.

Thus, when a copy guard signal is set, the clamped image signal will be destroyed by the signal killer circuit 9 of FIG. 7. Since only a constant D.C. signal is output, the image signal is not reproduced.

As mentioned above, the present invention can be easily employed into a VTR system. The present improved copy guard system also is capable of adapting AGC capability. Thus, when a copy guard signal is set, the present invention prevents recording and illegal copying from VTR systems.

Although a certain preferred embodiment has been shown and described, it should be understood that many changes and modifications may be made therein without departing from the scope of the appended claims.

What is claimed is:

1. A copy guard system for protecting software in a video tape recording (VTR) system, the copy guard system comprising:
    positive edge detection means for detecting a positive edge of an input VTR head switch pulse signal;
    negative edge detection means for detecting a negative edge of the input VTR head switch pulse signal;
    counter means for generating a fixed duration pulse signal in response to said positive edge;
    clamp means for clamping an input image signal;
    gate pulse generating means for generating a pulse signal before the end of said fixed duration pulse signal;
    level detection means for determining whether a copy guard signal is set in response to an output from said clamp means and the pulse signal generated by said gate pulse generating means;
    pulse detection generating means coupled to said level detection means for transmitting a rectangular waveform to a signal killer pulse generating means;
    said signal killer pulse generating means, responsive to the rectangular waveform from said pulse detection generating means and the signal output from said positive edge detection means, for generating a killer pulse in order to control a signal only during the period of having an image signal in one field; and
    signal killer means, for receiving the clamped output from said clamp means and at the same time receiving the killer pulse from said signal killer pulse generating means, for controlling the output of the image signal.

* * * * *